Aug. 15, 1939.   I. H. JUDD   2,169,648
MOTOR VEHICLE TRANSPORT
Filed April 27, 1936   5 Sheets-Sheet 1
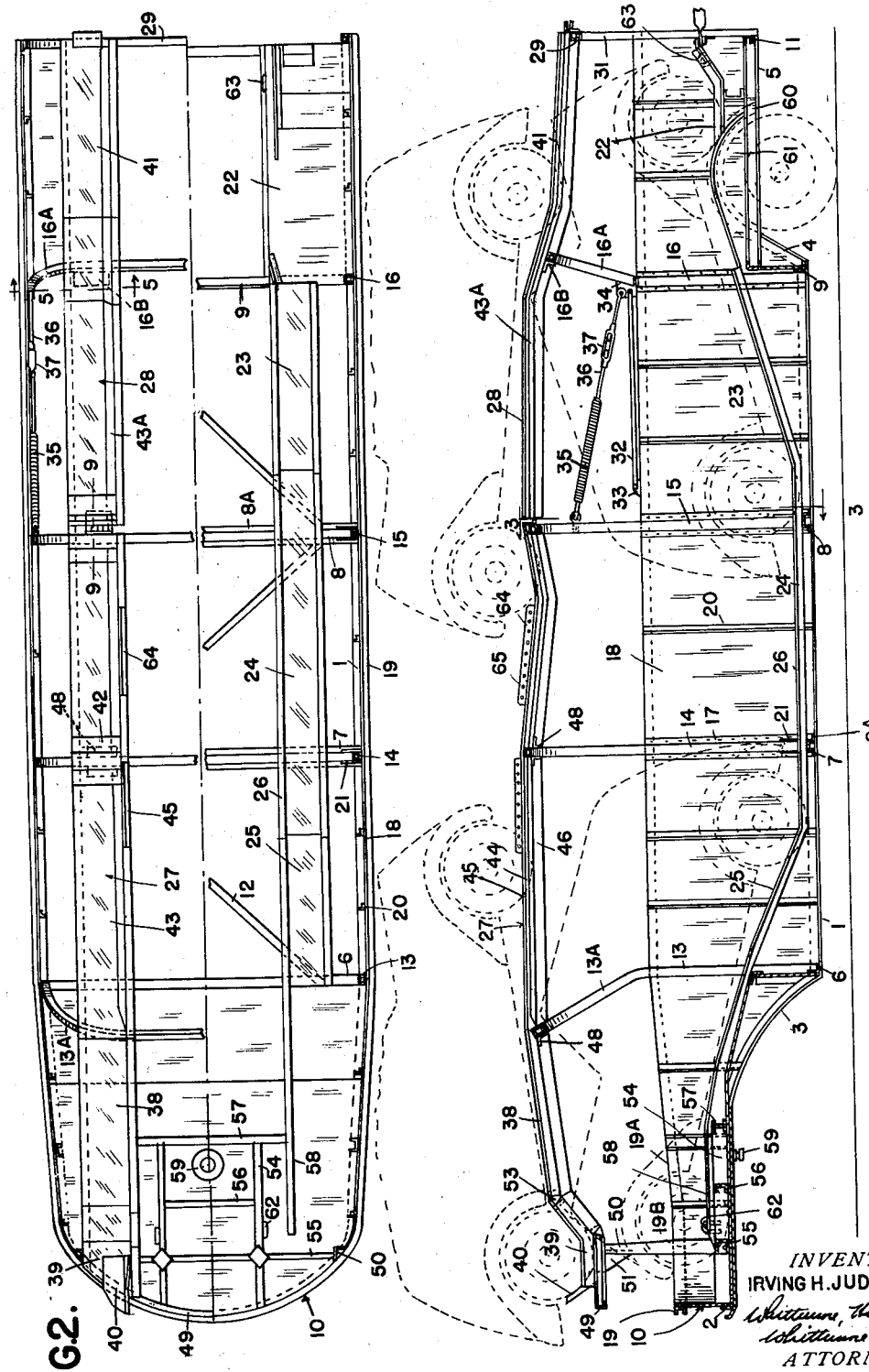
INVENTOR
IRVING H. JUDD
ATTORNEYS Aug. 15, 1939.  I. H. JUDD  2,169,648
MOTOR VEHICLE TRANSPORT
Filed April 27, 1936  5 Sheets—Sheet 2
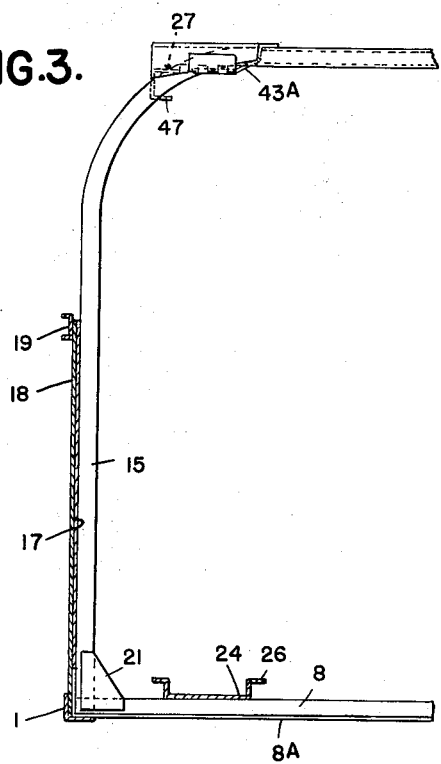
FIG.3.
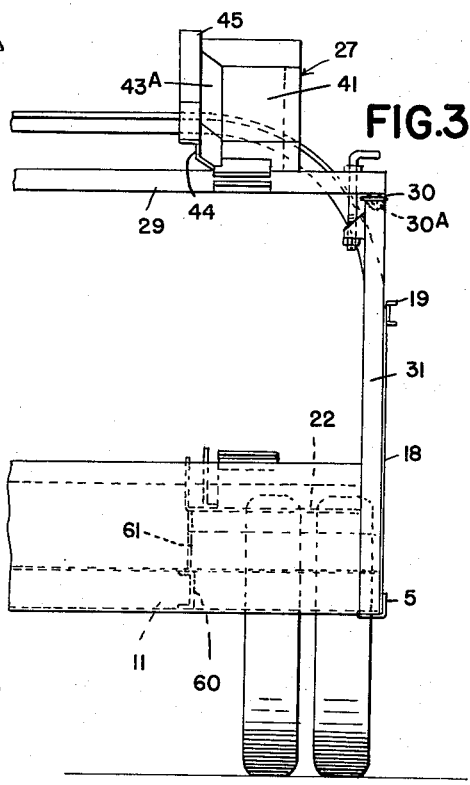
FIG.3.A
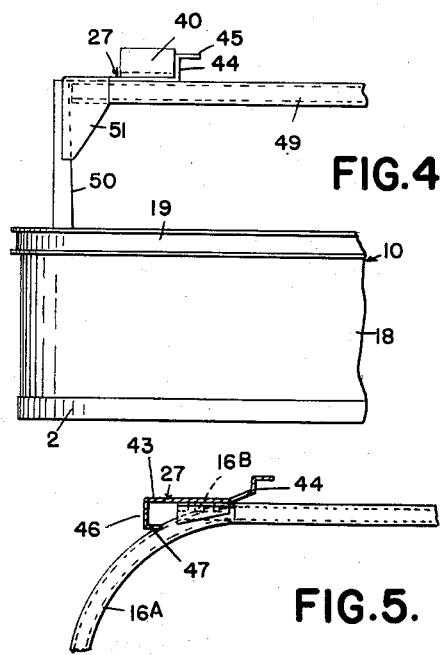
FIG.4.
FIG.5.
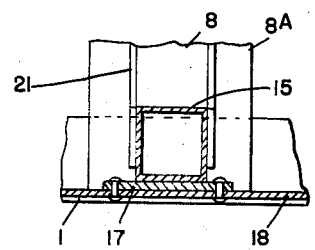
FIG.6.
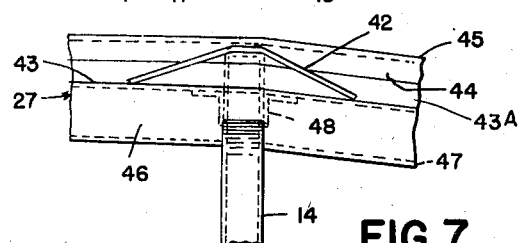
FIG.7.
INVENTOR
IRVING H. JUDD
BY
ATTORNEYS

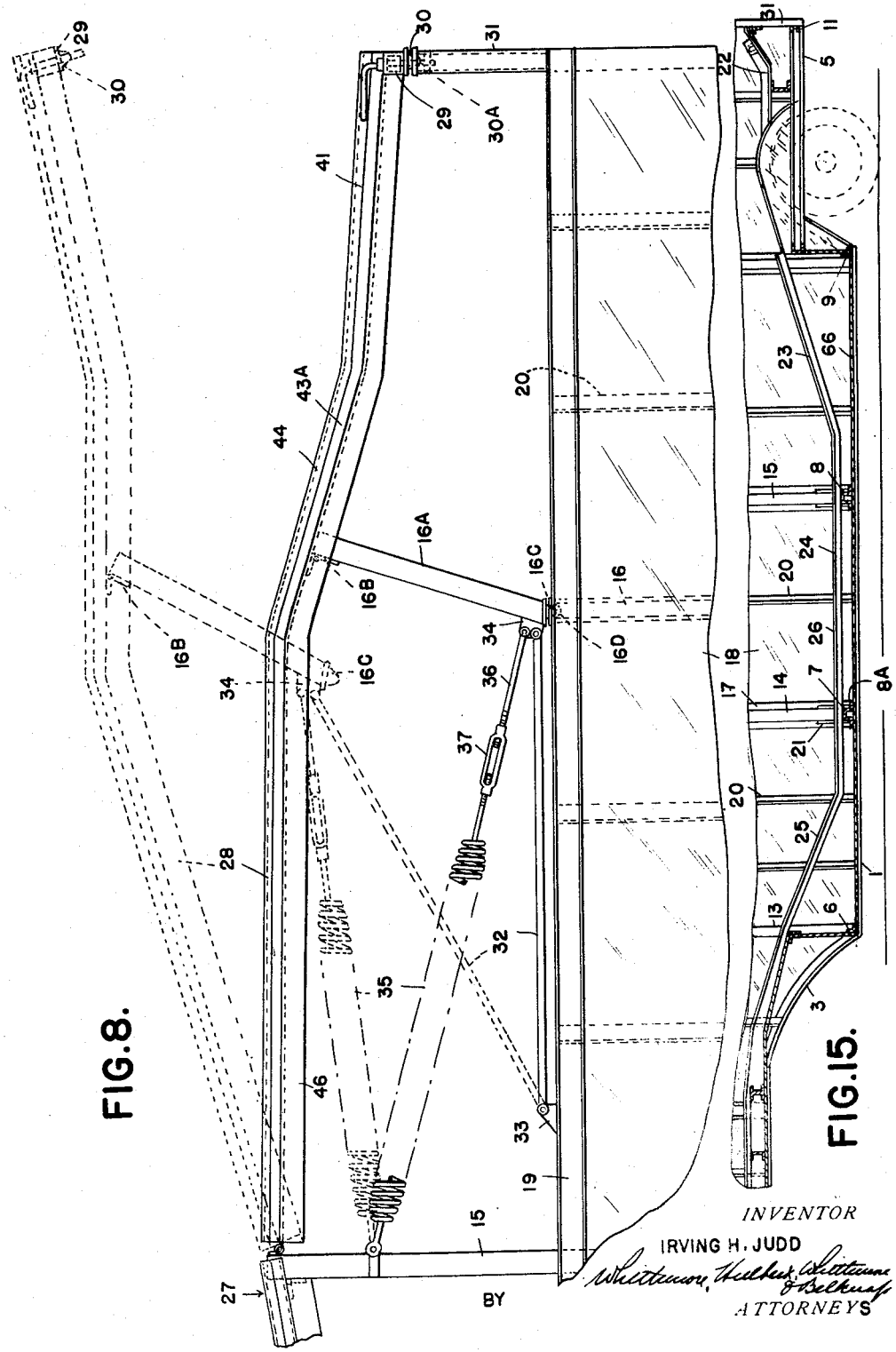

Aug. 15, 1939.     I. H. JUDD     2,169,648
MOTOR VEHICLE TRANSPORT
Filed April 27, 1936      5 Sheets-Sheet 4
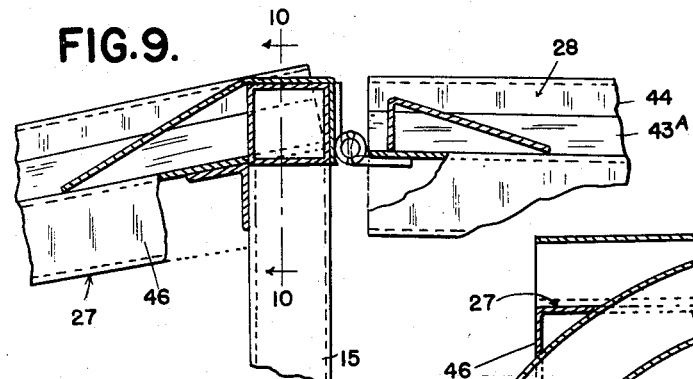
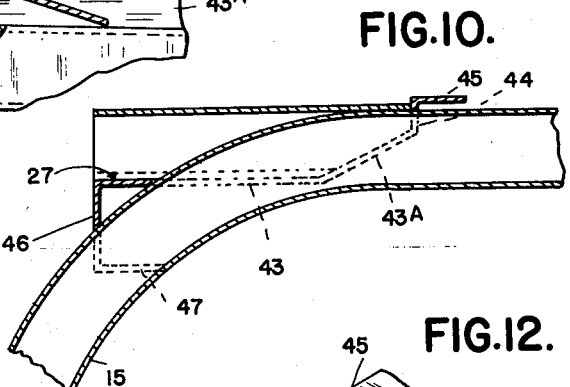
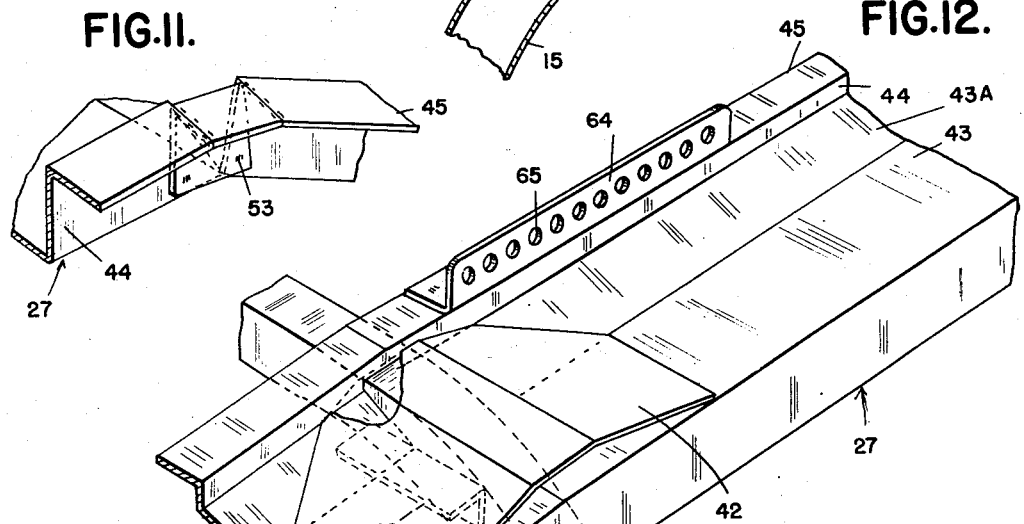
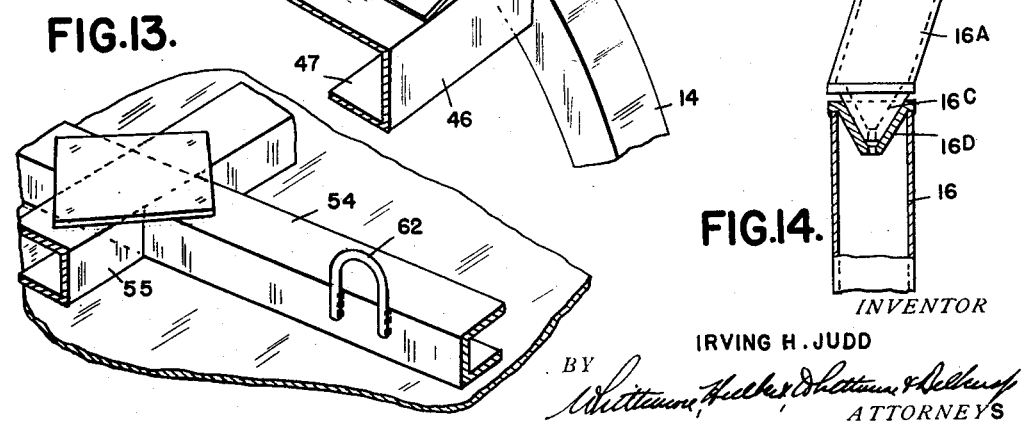
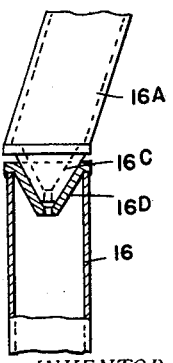
INVENTOR
IRVING H. JUDD
BY
ATTORNEYS

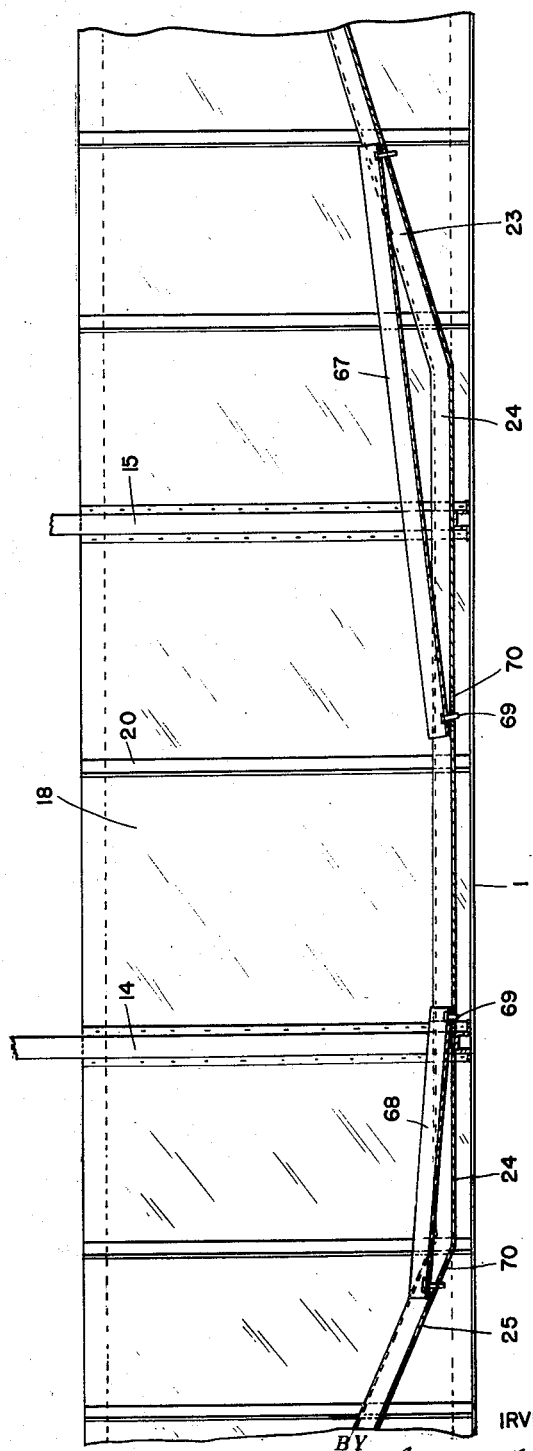

Patented Aug. 15, 1939

2,169,648

UNITED STATES PATENT OFFICE 2,169,648

MOTOR VEHICLE TRANSPORT

Irving H. Judd, Dearborn, Mich., assignor to Whitehead & Kales Company, River Rouge, Mich., a corporation of Michigan Application April 27, 1936, Serial No. 76,715

4 Claims. (Cl. 296—1)

The invention relates to motor vehicle transports of that type comprising a trailer for attachment to a motor truck and on which the motor vehicles are carried. It is the object of the invention to obtain an improved construction with particular reference: first to the storage of the load within minimum dimensions of space limits; second, to facilitate easy loading and unloading; third, to obtain a structure formed of simple structural elements which can be manufactured and assembled at relatively low cost and which with a minimum of weight impart to the structure the necessary strength and rigidity. With these and other objects in view, the invention consists in the construction as hereinafter set forth.

In the drawings:

Figure 1 is a vertical longitudinal section through a transport of my improved construction;

Figure 2 is a sectional plan view thereof;

Figure 3 is a cross-section on line 3—3 of Figure 1;

Figure 3A is a rear end elevation;

Figure 4 is a front elevation;

Figure 5 is a section on line 5—5 of Figure 2;

Figure 6 is a horizontal section through the post of one of the arch members;

Figure 7 is an elevation showing the hump in the track;

Figure 8 is an elevation of the hinged portion of the upper track showing the counterbalancing mechanism therefor;

Figure 9 is a section on line 9—9 of Figure 2;

Figure 10 is a section on line 10—10 of Figure 9;

Figure 11 is a perspective view showing the gusset plates between angular portions of the track section;

Figure 12 is a perspective view of a portion of the upper track showing the hump passing over the arch member and also the anchorage means;

Figure 13 is a perspective view of a portion of the frame showing the anchorage means for the lower tier cars;

Figure 14 is a detail view of the engagement between the movable arch member and post;

Figure 15 is a longitudinal section similar to Figure 1 showing a modified construction;

Figure 16 is a longitudinal section similar to Figure 1 showing another modification.

As above stated, my improved transport is in the form of a trailer which is drawn by a motor truck and which provides storage space thereon for a lower and an upper tier of cars. As there are restrictive limits to the dimensions of such a vehicle, it is the primary object to so design the same as to carry the load within the smallest possible space. The forward portion of the trailer which overlaps the truck platform is necessarily raised to clear the same, and in the rear provision must be made for the supporting wheels. Furthermore, as wheel loads cannot exceed a predetermined limit, this requires at least four wheels which can be arranged either in tandem pairs, or all on a common axis. I preferably employ the latter construction, and as this brings the inner wheels closer together than the wheels of the vehicles to be loaded, the lower tier tracks for the latter must pass over these wheels. However, in storage position the forward and rear wheels of the rearmost automobile in the lower tier are arranged to straddle the supporting wheels of the transport and to thereby diminish the clearance height. The upper tier tracks are so arranged as to straddle or otherwise clear all portions of the vehicles stored in the lower tier, and at the same time reduce to a minimum the clearance height of the vehicles in the upper tier. It is further necessary to provide for the raising of a portion of the tracks in the upper tier, so as to give clearance for loading and unloading the vehicles in the lower tier. The conditions just described are fulfilled in my improved structure as follows.

The base of the structure is formed by lower side sill members, the central portions 1 of which are dropped as low as possible with the requisite road clearance. The forward portions 2 of these sills are raised to clear the front platform, and are connected to the lower portions by curved portions 3. At the rear, the sill members 4 are curved upward and then downward to clear the supporting wheels, and in rear of these members are sill members 5 which extend to the rear end of the frame. All of these members are preferably of angle cross-section. The portions 1 of the side sills are cross-connected by cross-sills 6, 7, 8 and 9. The sills 6 and 9, as shown, are of angle cross-section, while the sills 7 and 8 are of an inverted channel cross-section having outwardly extending base flanges 8A. The forward portions 2 are connected to each other by an arcuate front portion 10, and the rear end portions 5 are cross-connected by a member 11. There are also diagonal cross-members 12 alternatively reversed in angularity to hold the side and cross-sills in rigid relation to each other.

Rising from these side sills are arch members 13, 14, 15 and 16 which include vertical post portions and transversely extending carline portions, the latter supporting the upper tier load. These arch members are preferably formed of tubing of rectangular cross-section as this facilitates attachment to adjacent members and also has a greater strength per weight ratio than round section tubing. The post portions of these arch members are reinforced on their outer sides by plate members 17, these being of greater width to extend on opposite sides of the posts and are preferably secured thereto by welding. To these plate members are attached sheeting plates 18 the upper edges of which form a substantially straight line, while the lower edges are fashioned to conform to the shape of the sill members. There is also a guard rail member which is attached to the upper edge portion of the member 18 as well as to the post. This guard rail 19 in its forward end portion which is above the truck platform inclines slightly downward in a forward direction, as indicated at 19A, terminating in a portion 19B which is lower than the main portion of the rail. This permits of certain portions such as the bumpers of automobiles loaded on the lower track to project beyond the forward end of the transport and above the portion 19B of the guard rail. The members above described which are rigidly secured to each other, preferably by riveting, together form a truss of which the sheeting 18 forms the web member. This sheeting is further stiffened and reinforced by intermediate post members 20 preferably of angle cross-section. There are also gusset plates 21 which connect the cross-sills 6, 7, 8 and 9 with the vertical posts.

The load in the lower tier is carried by track members which also serve for guiding the vehicles during loading and unloading. These track members are formed of a plurality of sections including a rear section 22 extending from the rear of the frame over the supporting wheels and constituting a fender therefor as well as the tracks, a section 23 which inclines downward from the section 22, a section 24 which extends above the cross-sills 7 and 8, and a section 25 inclining upward to the portion of the frame that is above the truck platform. All of these portions 22, 23, 24, and 25 are of channel cross-section with outwardly extending flanges 26 forming in effect Z-bars on each side of the track.

The load in the upper tier is supported upon track members 27 which are mainly supported by the carline portions of the arches 13, 14, 15 and 16. In order, however, to provide adequate clearance for the lower tier without unduly raising the upper tier the carline portions of the arches 14 and 15 extend above the tread portion of these track members 27 so as to form no obstruction therebeneath. The upper portion of the arch member 13 is also inclined forwardly, as shown at 13A, so as to avoid interference with the windshield of the car directly thereunder. The portion 28 of the track 27 which is in rear of the arch 15 is hinged thereto and is adapted to be raised for clearing the lower tier cars in the loading and unloading thereof. To permit of this movement, the arch 16 is formed in two sections, the upper portion 16A of which is hinged at 16B to the tracks 28, and at the sides inclines downwardly and forwardly to meet the vertical side post portions 16. The lower ends of the portions 16A are provided with tapering projections 16C which enter sockets 16D in the upper ends of the tubes 16 and form a coupling therewith. At the rear end of this hinge section is a tubular cross-member 29 which also is provided at its opposite ends with downwardly tapering projections 30 which enter sockets 30A in the upper ends of posts 31 and form a coupling therewith. Thus, when the hinge section 29 is swung upward it will leave an unobstructed space for the movement of the lower tier of cars over the tracks 22, 23 and 24 into storage position.

To facilitate the raising and lowering of the hinged section 28, I have provided a counterbalancing mechanism of the following construction. 32 are link members normally extending parallel to and above the rub rails 19 and pivotally attached at their forward ends to brackets 33 extending upward from said rails. The rear ends of the members 32 are pivotally connected to lugs 34 extending forward from the lower ends of the arch members 16A. 35 are springs anchored at their forward ends to the arch member 15 and inclining downard and rearward therefrom. The rear ends of these springs are connected by links 36, having adjustable turn buckles 37 therein, with the lugs 34. By means of these turn buckles the springs 35 may be placed under the proper initial tension so that when the hinged section 28 is raised its weight will be largely supported by the springs. During this raising movement, the arch section 16A will swing forward on its hinge 16B and the opposite sides of this arch member together with the links 32 will form in effect toggle levers which in rising approach alignment with each other. Thus, while the tension of the springs 35 is diminished during the upward swinging movement, it will, nevertheless, be sufficient in connection with these toggle levers to hold the section 28 in raised position.

The upper track members 27 and 28 are further fashioned so as to drop the cars supported thereon as low as possible. This is accomplished by providing a downwardly inclined portion 38 at the forward end of the portion 27 terminating in a further depressed portion 39 at the forward end of the frame. The portion 39 is adapted to support the rear wheels of a car when reversely arranged on the tracks, and upwardly curved portions or chocks 40 hold the wheels from rolling off the front end. The hinged sections 28 of the tracks have their rear ends depressed, as indicated at 41, to receive the rear wheels of a car which is forwardly facing on the tracks. As has been stated, the arches 14 and 15 have their carline portions extending above the tread portions of the track, and to permit of moving the wheels of the cars thereover, double incline members 42 are provided. These constitute humps over which the wheels of the cars will ride without danger of disengagement from the tracks.

As the transport is sometimes used for carrying vehicle provided with dual wheels, the upper tracks are so formed as to prevent interference with such wheels. Thus, as shown, these upper track members are of a cross-section including a tread portion 43, an upwardly extending flange 44 on the inner side of the track terminating in a laterally extending flange 45 and a downwardly extending flange 46 on the outer edge of the track terminating in a downwardly extending return-bent flange 47. The inner upwardly extending flanges 44 form guides for holding the vehicle on the track, while the outer edge of the track is unobstructed and will permit dual wheels to project thereover. These upper track members are secured in position on the arch members by angle brackets 48, one flange of each of which is secured to the carline portions and the other to the underside of the tread portion 43 of the tracks. At their forward ends the track members are secured to an arcuate member 49 corresponding to and above the member 10 being supported thereon at opposite ends by posts 50 secured to said member and braced by gusset plates 51. This leaves the front end of the transport unobstructed so that the forward car in the lower tier can project slightly beyond the forward end of the transport as previously described. The several track sections are formed preferably by bending from sheet metal blanks, and where there is a change in direction longitudinally, the upper and lower flanges 44 and 46 are severed and gusset plates 53 are welded thereto to fill the gap.

The forward portion of the frame which overlaps the truck platform is suitably reinforced by longitudinal and cross-members 54, 55, 56, 57 and 58 to form a connection from the king pin 59. At the rear of the frame are longitudinal and transverse beam members 60 through which the load is carried into the axle and wheels through a suitable spring support (not shown). The members 60 are arranged on the inner side of the wheels and to complete the wheel housing, plates 61 extend therefrom upward to the member 22 which forms a combined track and wheel fender.

With the construction as thus far described to load the support the hinged track sections 28 are raised in the manner before described and are supported in this positon by the springs 35 and toggle links 16A and 32. A suitable skid is then placed in rear of the transport with its forward end connected to the rear end of the track section 22. The first car for the lower tier is then driven forwardly onto the tracks and to the forward end of the frame where the front wheels rise onto the upwardly stepped portion. In this position, the radiator of the car will be just in rear of the depressed portion 39 in the upper tracks and the windshield will be slightly in rear of the forwardly inclined arch. The second car for the lower tier is backed onto the tracks and when in position will have its rear wheels supported on the depressed portion 24 of said tracks and its front wheels upon the portion 22 in rear of the supported wheels for the transport. After this car is in position, the hinged track section 28 is again lowered and in so doing the toggle link 32 will swing the upper portion 16A of the arch member back into position where the tapering projections 16C will enter the sockets 16D. At the same time, the projections 30 at the rear end will enter the sockets 30A on the rear post 31. The upper tier cars are then driven on through the medium of a suitable skid, the forward car being backed upon the tracks until its rear wheels rest upon the forward depressed portions 39, being held from further movement by the chocks 40. The rear upper tier car is driven on forwardly and its rear wheels rest upon the depressed rear portion 41 of the tracks. The cars are anchored in their several positions preferably by providing links 62 and 63 fastened respectively to the forward and rear portions of the frame adjacent to the lower tracks and to which the cars may be secured by any suitable means. Also, the upper tracks have attached to the laterally extending flanges 45 thereof and upon the forward and rear sides of the arch member 17, angle members 64, the upwardly extending flanges of which are provided with a series of perforations 65 to which the chains or other fastening devices may be adjustably secured.

One important feature of my improvement is the manner in which the frame is trussed longitudinally. This is accomplished through the side sheeting 18 in cooperation with the lower cord member formed by the side sills and the upper cord member formed by the rub rail. All of the separate sections of this sheeting have their marginal edges riveted or otherwise secured to the frame members adjacent thereto, as well as to the intermediate stiffening members, so that a high degree of strength and rigidity is obtained with a relatively light weight of material. The square cross-section arches also facilitate attachment thereto of the reinforcing members 17 and the sheeting as well as the upper track members which are supported on the transverse or carline portions of each arch. Through these and other advantageous features heretofore mentioned, the whole structure is one which is well adapted to meet the conditions incident to the transportation of motor vehicles.

It is sometimes desirable to provide for carrying other articles than the motor vehicles, and where this is the case the lower tier may be provided with a floor. This floor 66 can be placed between the cross members 6, 7, 8 and 9 and the sill members on opposite sides thereof, as shown in Figure 15. With this construction the inclined cross members 12 may be omitted and the floor will by itself provide sufficient bracing to hold the frame in rectangular form.

As has been previously described, the tracks in the lower tier over which cars are run in loading have adjacent portions thereof at a considerable angle to each other and it sometimes occurs that this abrupt change in angle will cause some part of the car to strike against some portion of the transport. To avoid such result, and also to adapt the transport to the handling of cars of all makes, I preferably provide adjustable skid sections 67 and 68 for extending across these angle bends in the track. Thus as shown, the skid 67 bridges across the angle between the sections 23 and 24 of the tracks and the skid 68 bridges across the angle between the sections 24 and 25. These skids are secured in position by bolts or pins 69 passing through apertures at the opposite end of the tread portion thereof and adjustably engaging one of a series of apertures 70 in the track sections 23, 24 and 25. This permits of changing the angle and also of raising or lowering the skids 67 and 68 as may be required to provide proper clearance for any particular make of car.

One of the principal objects of my improved construction is to reduce the over-all height of the loaded transport to the minimum and this necessitates the arrangement of the tracks for the upper tier as low as possible consistent with providing clearance for the cars in the lower tier. I have found that the upper tracks may be further lowered without cutting down on clearance for the lower cars, by changing the track cross-section as shown in Figure 5. Thus, in place of a right-angle bend between the tread portion 43 and upwardly extending flange 44, I provide an oblique intermediate portion 43A. This will provide additional clearance for the cars in the lower tier as the tops of these are of a rounding transverse section. At the same time, it will not interfere with the traveling of the upper tier cars over these tracks, as the oblique section 43A and upwardly extending flange 44 will still hold the wheels from disengagement therefrom.

What I claim as my invention is:

1. In a vehicle for transporting a plurality of fully assembled automobiles, a pair of side frame members extending longitudinally of said vehicle, an upper car carrying deck extending longitudinally of said vehicle and curved downwardly from the center thereof, and supporting frames extending upwardly from, and at an angle to, said side frame members, and in a direction substantially normal to the curve of said deck and supporting said deck.

2. In a vehicle body of the character described, a pair of elongated side panels spaced laterally apart to permit the passage therebetween of an automobile, the height of said side panels being less than the height of the automobile to be carried, an automobile carrying track spaced above the upper edges of said side panels and having downturned end portions, and supporting frame members extending upwardly from, and at an angle to, said side panels, and in a direction substantially normal to the curve of said downturned end portions and supporting said track.

3. In a vehicle body of the character described, a frame having upright post portions spaced laterally apart to permit the passage therebetween of an automobile, upwardly and inwardly curved portions projecting from the upper ends of said post portions, and substantially horizontal portions extending between the inner ends of said curved portions, and track members mounted upon said curved portions, each track member having a tread portion, an upwardly extending flange at the inner side of said tread portion terminating in a laterally extending flange, and a downwardly extending flange at the outer side of said tread portion terminating in an inwardly extending flange, the first and last mentioned flanges and said tread portion having transversely extending slots therein receiving one of said curved portions.

4. In a vehicle body of the character described, a frame having upright post portions spaced laterally apart to permit the passage therebetween of an automobile, upwardly and inwardly curved portions projecting from the upper ends of said post portions, and substantially horizontal portions extending between the inner ends of said curved portions, track members crossing and having portions substantially tangent to said curved portions of the frame, and means securing said track members in position on said curved portions of the frame including brackets having portions rigid with said track members and having other portions rigid with said curved portions of the frame.

IRVING H. JUDD.